Aug. 28, 1951   E. W. KETTERING   2,566,212
LOCOMOTIVE VENTILATING AND COOLING SYSTEM
Filed Aug. 7, 1948                    2 Sheets-Sheet 1
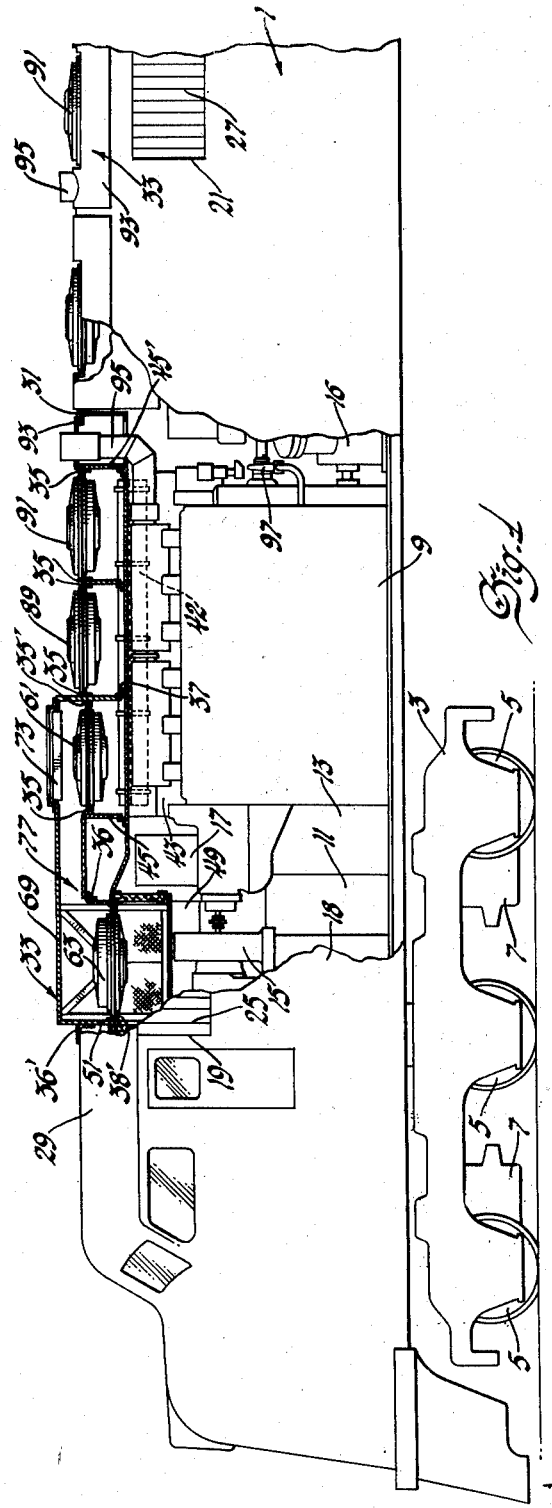
Inventor
Eugene W. Kettering
By Spencer, Willets, Helwig & Baillie
Attorneys Aug. 28, 1951     E. W. KETTERING     2,566,212
LOCOMOTIVE VENTILATING AND COOLING SYSTEM
Filed Aug. 7, 1948     2 Sheets-Sheet 2
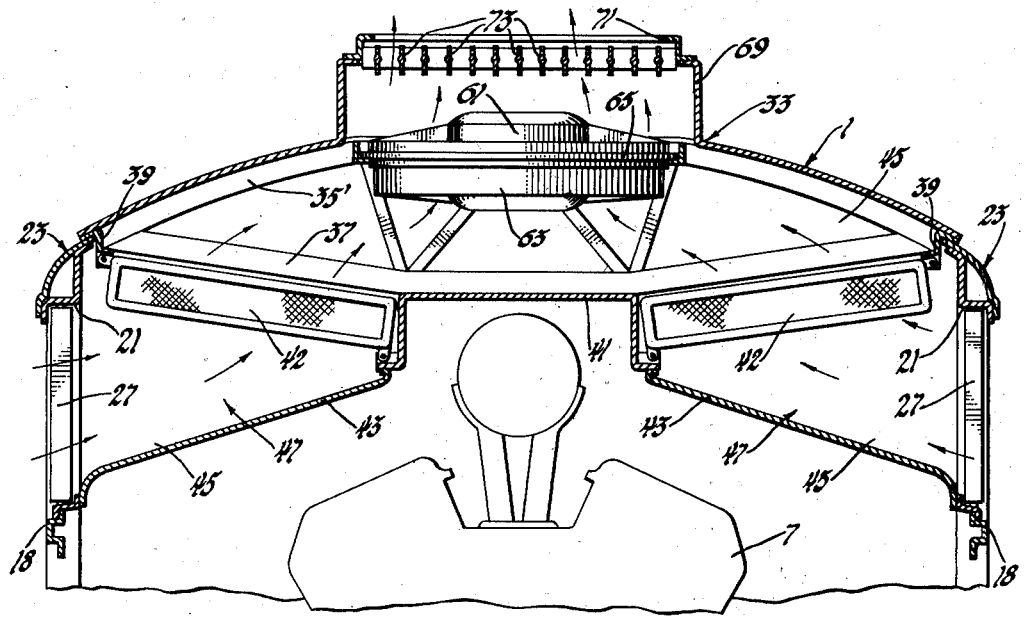
Inventors
Eugene W. Kettering
By
Spencer, Willits, Helwig & Baillio
Attorneys Patented Aug. 28, 1951

2,566,212

UNITED STATES PATENT OFFICE 2,566,212

LOCOMOTIVE VENTILATING AND COOLING SYSTEM

Eugene Williams Kettering, Hinsdale, Ill., assignor to General Motors Corporation, Detroit, Mich., a corporation of Delaware Application August 7, 1948, Serial No. 43,056

7 Claims. (Cl. 237—12.4)

This invention relates to ventilating apparatus for railway vehicles and more particularly to such apparatus for use on generating electric locomotives.

The wide variations in ambient temperature of and impurities in the air required for engine combustion and also for cooling the engine and electric traction equipment driven thereby, together with that required by the air brake equipment on a generating electric locomotive throughout the year, makes it necessary to control the temperature of the air and remove impurities therefrom in order to insure efficient operation and long life of the engine, electric traction and air brake equipment and provide comfortable conditions for the locomotive crew especially in extremely cold weather and to prevent freezing of the engine coolant.

The principal object of this invention is to provide a very simple ventilating and engine cooling system for a generating electric locomotive including simple control means for providing sufficient clean air at proper temperature for the locomotive power and air brake equipment to insure efficient and trouble free operation thereof and comfortable conditions for the locomotive crew under wide variations in ambient temperature of and impurities in the air used.

The means by which this object is accomplished and other features of the invention will become apparent by reference to the following detailed description of and drawings illustrating one form of the invention included in the cab structure of a diesel electric locomotive.

Figure 1 of the drawings is a partial side elevation view of the locomotive with parts broken away and in section to illustrate details of the invention.

Figure 2 is an enlarged view of a portion of Figure 1 taken on the longitudinal center line of the locomotive cab with parts broken away and in section.

Figure 3 is a transverse sectional elevation view taken on line 3—3 of Figure 2 with parts broken away and in section.

Figure 4 is a transverse sectional elevation view taken on line 4—4 of Figure 2 with parts broken away and in section.

As best illustrated in Figure 1 the locomotive cab 1 is supported on articulated traction trucks 3 having three axles and attached wheels 5 and conventional nose suspended traction motors 7 operatively connected to certain of the truck axles in conventional manner.

Included in the cab 1 is the power plant comprising a diesel engine 9 operatively connected to a traction generator 11 supplying power to the traction motors 7 and also operatively connected to an alternator 13 supplying power to induction motor driven ventilating and cooling fans, to be subsequently described. A blower 15 and an air brake compressor 16 are shown operatively connected to the engine 9 having an induction air pipe 17 and each of these machines receive air from the interior of the cab 1. The blower 15 forces air from the cab 1 through suitable ducts, not shown, to the traction generator and motors 11 and 7 to cool them.

As best illustrated in Figures 1, 3 and 4, the opposite side walls 18 of the locomotive cab 1 are provided with cab ventilating air inlet openings 19 and also air inlet openings 21 for conventional engine coolant radiators to be subsequently described. The air inlet openings 19 and 21 are spaced longitudinally directly below the upper side plate members, indicated generally at 23, of the cab. Manually operable shutters 25 are located in each of the inlet openings 19 and a plurality of shutters 27 each manually operable are located in each of the air inlet openings 21 for controlling the air flow through these openings. The upper roof portion of the cab between the roof portions 29 and 31 is formed by a removable fabricated hatch, generally indicated at 33. This hatch comprises upper members of arcuate form serving as transverse carline members 35, 35', 36 and 36' and lower chord members 37, 38 and 38' of angle form. These carlines and chords are secured at the ends to hatch side members 39 of Z form, shown in Figures 3 and 4, provided with a flange supported on each of the upper side plate members 23 of the cab 1 above side air inlet openings 19 and 21. An inverted channel member 41 is secured between the lower central portions of the hatch chord members 37 and engine coolant radiators 42 are shown secured between this lower central channel member 41 and each of the hatch side members 39.

As best illustrated in Figures 1, 2 and 3, inwardly and upwardly extending plates 43 are secured between the lower edges of the air inlet openings 21 and the central member 41 of the hatch and vertical end plates 45 and 45' are secured to the ends of the plates 39, end edges of the openings 21, side walls and side plates 23 of the cab and between the end carlines 35 and 35' and chords 37 and side members 39 of the hatch 33 to form radiator air inlet cooling ducts, generally indicated at 47.

As best illustrated in Figures 1, 2 and 4 other upwardly and inwardly extending plate members 49 are secured between the lower edges of the opposite cab side openings 19 and the hatch chord members 38 and 38' and end plates 51 and 51' are secured to the ends of these plates 49, the vertical end edges of the openings 19, the cab plate members 23, hatch side members 39, of the hatch chord members 38 and 38' and carlines 36 and 36' to form cab ventilating air inlet ducts, generally indicated at 53.

As best seen in Figure 2, vertical transverse partitions 55 and 57 are secured between the hatch carlines 35 and 35', chords 37 and the lower central member 41 to form three separate radiator exhaust air ducts, generally indicated at 59. An induction motor driven radiator exhaust fan 61 having a housing 63 provided with a mounting flange 65 is shown mounted on adjacent hatch carlines 35 and 35' and between the end plate 45 and partition 55 of the hatch 33.

An identical induction motor driven fan 67 is mounted in inverted position by means of its housing flange 65 on adjacent chords 38 and 38' and between end plates 51 and 51' of the cab ventilating ducts 53 to serve as a cab ventilating air inlet fan. The lower air discharge end of the cab ventilating fan 67 projects downwardly through openings in the ventilating ducts 53 and into the cab 1. The central vertical portion of the hatch end plate 51 projects upwardly from the adjacent cab roof portion 29 and the vertical central portion of the hatch partition 55 also extends upwardly the same amount and a hatch cover plate 69 is secured to the top and side portions of these upwardly extending portions and is also secured to the outer ends of the carlines 35, 35', 36 and 36' either side thereof. The upper central portion of the hatch cover plate 69 is provided with a radiator exhaust air opening 71 directly above the radiator exhaust fan 61 and this exhaust opening is provided with manually operable shutters 73 for controlling the flow of air exhausted therethrough. A lower closure plate 75 is secured between the vertical side portions of the hatch cover plate 69 and the adjacent hatch carlines 35' and 36 to form a longitudinal air duct, generally indicated at 77, connecting the upper exhaust end of the radiator exhaust fan 61 and the upper inlet end of the cab ventilating fan 67 and the air inlet ventilating ducts 53, the upper portions of which are formed by the hatch cover plate 69.

An air filter is provided on the discharge end of the cab ventilating fan 61. This filter, generally indicated at 79, is provided with a bottom closure plate 81 secured by upright members 83 and 85 to the hatch chord members 38 and 38' and to vertical end plate members 51 and 51' of the ventilating ducts 53 and air filter elements 87 form the sides of the filter 79 and are positioned between the lower plates 49 of the ventilating ducts 53 and the bottom plate 81 of the filter 79 so that outside air is drawn in through the ventilating ducts 53 and discharged horizontally through the filter elements 87 into the upper portion of the cab interior by the ventilating fan 67.

Two other identical induction motor driven radiator exhaust fans 89 and 91 identical to the fan 61 are provided. The housing mounting flange 65 of the exhaust fan 89 is secured to the central portion of the adjacent hatch carlines 35 and 35 between the partitions 55 and 57 and the housing flange 65 of the other exhaust fan 91 is secured to the central portion of other hatch carlines 35 and 35 and between the partition 57 and end plate 45, as best shown in Figures 1 and 2. An extension 93 of the hatch cover plate 69 is secured to the hatch carlines 35 and side members 23 and is provided with openings therein through which the upper exhaust ends of the radiator exhaust fans 89 and 91 and an engine exhaust pipe 95 projects upwardly on the center line of the hatch 33. The hatch cover extension 93 is shown in Figure 1 extending over and in contact with cab roof portion 31 and the horizontal flange of the hatch carline 36' at the opposite end of the hatch 33 is shown in contact with the adjacent end of the cab roof portion 29. In the upper right-hand corner of Figure 1 another identical hatch 33 is shown but mounted in opposite end to end relation on the cab 1 in a similar manner.

Suitable coolant connections, not shown, include an engine driven coolant pump 97 for circulating coolant through the engine coolant jackets and radiators 42 in conventional manner. The alternator 11 is connected electrically by suitable conductors and individual switching means, not shown, to each of the induction motor driven radiator exhaust fans 61, 89 and 91 and the induction motor driven cab ventilating fan 67 so that when supplied with power from the alternator 13 the fan or fans will operate at a speed proportional to the engine 9 and the alternator 13 and traction generator 11 driven thereby. As explained the blower 15 for supplying cooling air to the traction generator 11 and motors 7 and the air brake compressor 16 are directly driven by the engine 9.

In warm weather the shutters 25 in the air inlet openings 19 in opposite sides of the cab 1 of the cab ventilating ducts 53 are opened and filtered air is forced into the cab interior through these ducts by means of the induction motor driven ventilating fan 67 and the filter 79 on the outlet side thereof when supplied with power from the engine driven alternator 13. The various shutters 27 in the radiator inlet air openings 21 are also open and outside air is drawn in the radiator inlet ducts 47 and through the radiators and the heated air from the radiators is exhausted to atmosphere through any one or all three radiator exhaust air outlet ducts 59 by any or all of the induction motor fans 61, 89 and 91 operating; as the shutters 73 in the exhaust opening 71 above the exhaust fan 61 is also open in warm weather. When all three of the radiator exhaust fans 61, 89 and 91 are operating sufficient cooling air for the radiators 42 is supplied to prevent overheating when the locomotive is operated at maximum load under adverse conditions, such as in tunnels. The cab ventilating fan 67 is capable of supplying sufficient filtered air for engine combustion, the air brake compressor 9, and blowers 15 for cooling the traction generator and motors 13 and 7 when the locomotive is operated at full load under these adverse conditions. In cold weather in order to maintain proper temperature of the engine coolant and the filtered air entering the cab 1 for engine combustion and for ventilating the traction generator and motors and the air compressor 16 at proper values for efficient operation thereof and also to maintain comfortable temperature in the cab for reduced values of ambient air temperature; the various radiator shutters 27 may be closed separately or in combination and the radiator exhaust fans 89 and 91 shut down and the exhaust shutters 73 in the exhaust opening adjacent the radiator exhaust fan 61 may be moved to the closed position. The heated air from the radiator exhaust fan 61 is then diverted through the duct 77 to cab ventilating air ducts 53 and this heated air mixes with the cold air drawn in through the openings 19 of this duct and is discharged through the filter 79 to the interior of the cab to maintain proper temperature therein. When the locomotive is stopped in extremely cold weather, only the radiator shutters 27 controlling the air flow through a portion of the radiator or radiators 42 to the exhaust fan 61 are opened slightly and the shutters 73 adjacent the exhaust side of this fan and the shutters in the inlet openings of the ventilating duct may be fully closed so that all the heated air from the radiator exhaust fan 61 is delivered through the duct 77 to the ventilating fan 61 from which it is discharged through the filter to the interior of the cab to prevent freezing of the engine coolant when the engine is idling and the above mentioned fans are operating at a slower rate proportional to the engine speed. The shutters 25, 27 and 73 and ventilating and radiator fans 67, 61, 89 and 91 may accordingly be operated separately or in various combinations to maintain sufficient clean air at proper temperatures in the cab 1 for the comfort of the crew and to maintain proper engine coolant temperature for efficient operation of the locomotive for wide ranges in load conditions on the locomotive and ambient air temperatures.

The provision of separate radiator exhaust fans 63 and ducts 59 also provides series or series parallel air flow through different portions of the radiators 42 when some of the exhaust fans are operated and the shutters 27 in the radiator air inlet openings 21 are tightly closed. In this case air is drawn downwardly through the exhaust ducts 59 in which the exhaust fans 63 are not operating and upwardly through the exhaust ducts in which the exhaust fans are operating.

I claim:

1. In a locomotive, a cab including power operated traction and braking means requiring air at proper temperature for efficient operation and cooling thereof, said cab having a ventilating air duct including a ventilating fan and having an outside air inlet opening and a fan discharge opening inside the cab, shutter means in the inlet air opening for controlling the air flow therethrough and a filter on the discharge opening, a cooling air duct including cooling radiators for certain of the power operated means and radiator cooling fans and having outside air inlet and discharge openings, the outside air inlet openings of said cooling duct having shutters therein for controlling inlet air flow, and a connecting air duct having one end connected to one discharge opening of the radiator cooling duct and the other end connected to the inlet of the ventilating duct between the inlet shutters and ventilating fan, said connecting air duct having an outside air discharge opening provided with shutters therein adjacent one cooling fan for controlling the amount of heated air from the radiator through the discharge opening in the connecting duct to control the amount of flow of heated air therethrough to the ventilating duct.

2. In a locomotive, a cab having outside air inlet openings including shutters operable to control the air therethrough and a roof having an opening therein, a ventilating and cooling hatch covering said opening including a cooling duct connected to certain of the outside air openings in the cab, a cooling radiator therein, and separate radiator exhaust air ducts each including an exhaust fan, a ventilating air duct connected to the other cab air inlet openings and including a ventilating fan and filter for discharging filtered air into the cab and a connecting air duct connecting one of the radiator exhaust air ducts to the ventilating duct ahead of the ventilating fan and filter therein and having an exhaust air opening including air flow control means for controlling the amount of heated exhaust air from one exhaust fan through the connecting duct to the ventilating duct and through the exhaust air opening in the connecting duct.

3. In a locomotive, a cab structure having outside air inlet openings in opposite sides of the cab adjacent the roof and exhaust openings in the cab roof and including an internal combustion engine and an alternator, electric traction means, an air brake compressor and a blower for the traction means operable by the engine, a ventilating air duct connected between certain of the cab inlet openings having an outlet opening in the cab and including a ventilating fan and filter, a cooling air duct connected between certain other of the cab inlet openings and including engine cooling radiators, exhaust air ducts leading from the radiators to each of the cab exhaust openings, one of said exhaust openings having exhaust shutters therein, a radiator exhaust fan in each exhaust duct, an air connecting duct connecting the exhaust air duct provided with exhaust shutters to the inlet of the ventilating air duct, said exhaust shutters operable to regulate the heated air from at least one of the radiators to the exhaust opening and to the inlet of the ventilating duct, and induction motors for driving the ventilating and exhaust fans and adapted to be connected to the engine driven alternator so that the speed of these fans are proportional to that of the alternator.

4. In a locomotive cab having openings in the side walls and roof and a hatch covering the roof opening having a ventilating duct connecting openings in the opposite side walls of the cab and having an outlet in the cab interior, a ventilating fan and filter in the duct for forcing filtered air through the outlet, a cooling duct connecting the other openings in opposite side walls of the cab, radiators in the cooling ducts adjacent the opening and partitions in the cooling duct extending between the radiators forming separate radiator exhaust ducts opening upwardly out of the hatch, a radiator exhaust fan in each exhaust duct, and an air connecting duct connected between at least one exhaust duct and the ventilating duct ahead of the ventilating fan, said connecting air duct having an upwardly opening air outlet including shutters therein.

5. In a hatch for a roof opening of a locomotive cab a ventilating duct having inlet openings at the sides and a bottom outlet, a filter in the outlet and a ventilating fan in the ventilating duct for forcing air through the filter, a cooling duct having side inlets, cooling radiators in the inlets, partitions in the cooling duct forming a plurality of exhaust ducts opening upwardly out of the hatch, an exhaust fan in each exhaust duct, and a connecting duct having an upwardly extending exhaust outlet including shutters and connecting the outlet of at least one exhaust duct to the ventilating duct ahead of the ventilting fan.

6. In a locomotive, a cab including a cooling air duct and a ventilating air duct having air inlet and air outlet branches, said cooling air duct including outside air inlet openings each including shutters, outside air outlet openings, one outlet opening including shutters, radiators and separate motor driven radiator cooling fans, said air inlet branch of the ventilating duct having one end connected to the cooling air duct between the outlet therein, including shutters and the radiators and having an outside air inlet opening, including shutters, in the other end, said air outlet branch of the ventilating duct extending from a point between the ends of the inlet branch and having an outlet opening within the cab and an air filter and a motor driven fan in the outlet branch for forcing filtered air into the cab.

7. In a locomotive, a cab including separate cooling air outlet ducts, each having a radiator, a motor driven cooling fan and outside air outlet openings, one air outlet opening including shutters, a cooling air inlet duct connected to the cooling air outlet ducts and having a plurality of outside air inlet openings, each inlet opening having shutters therein and a ventilating duct having an inlet branch and an air outlet branch, said inlet branch being connected at one end to the cooling air outlet duct between the outlet opening, having shutters therein, and the radiators and having an outside air inlet opening including shutters in the other end, said outlet branch of the ventilating duct extending from a point intermediate the ends of the inlet branch and having an air outlet opening within the locomotive cab and also including an air filter and a motor driven fan for delivering filtered air into the cab.

EUGENE WILLIAMS KETTERING.

REFERENCES CITED

The following references are of record in the file of this patent:

UNITED STATES PATENTS

| Number | Name | Date |
| --- | --- | --- |
| 2,009,823 | Van Vulpin et al. | July 30, 1935 |
| 2,116,538 | Mussey et al. | May 10, 1938 |
| 2,271,158 | Browne | Jan. 27, 1942 |